United States Patent [19]

LaValley

[11] Patent Number: 4,540,457
[45] Date of Patent: Sep. 10, 1985

[54] BUTTERFLY VALVE WITH PRESSURIZED O-RING SALE

[75] Inventor: Richard W. LaValley, Vancouver, Wash.

[73] Assignee: LaValley Industrial Plastics, Inc., Vancouver, Wash.

[21] Appl. No.: 473,642

[22] Filed: Mar. 9, 1983

[51] Int. Cl.³ ............................................. F16K 1/226
[52] U.S. Cl. .................................... 156/182; 156/213; 156/292; 251/173; 251/305; 251/368
[58] Field of Search ........................ 156/182, 213, 292; 264/263, 242; 251/173, 368, 305, 308, 306

[56] References Cited

U.S. PATENT DOCUMENTS

| | | | |
|---|---|---|---|
| 1,813,126 | 7/1931 | Sheppard | 251/173 |
| 2,705,016 | 3/1955 | Saar | 251/173 |
| 3,394,914 | 7/1968 | Nagasato | 251/173 |
| 3,565,394 | 2/1971 | Smith | 251/306 |
| 3,750,698 | 8/1973 | Walchle et al. | 251/305 |
| 3,840,208 | 10/1974 | Schudel et al. | 251/173 |
| 4,026,514 | 5/1977 | Sumner et al. | 251/173 |
| 4,241,897 | 12/1980 | Maezana | 251/306 |
| 4,253,641 | 3/1981 | VanRyck | 251/368 |

*Primary Examiner*—Michael Ball
*Attorney, Agent, or Firm*—Klarquist, Sparkman, Campbell, Leigh & Whinston

[57] ABSTRACT

A butterfly valve for use with corrosive fluids is constructed of fiberglass-reinforced plastic (FRP). The valve blade is mounted in the valve body on a shaft comprising a continuous strand fiberglass-reinforced plastic rod secured in a sleeve. Exposed end portions of the rod are coated with plastic resin and machined for journaling in the valve body. An FRP sealing layer coats the sleeve and adjacent portion. A pressurizeable O-ring seal surrounds the passageway of the valve body for sealing against the periphery of the blade. The periphery of the blade is rounded and sized so that the O-ring cups the periphery of the blade when closed. The valve body is formed in two tubular sections which are connected together during assembly of the valve. The end faces of the two sections are oppositely beveled to jointly form an inverted V-shaped channel for the O-ring seal. The beveled end faces provide acutely angled edges tangentially contacting the sides of the O-ring along the inner surface of the valve body. During assembly, the O-ring is positioned between the beveled faces and fiberglass-reinforced plastic putty is laid in the channel along the exterior lateral sides of the O-ring to form wedges to retain the O-ring in position. An exterior overlay of fiberglass-reinforced plastic is then applied across the channel to connect the two sections together to form a unitary valve body.

12 Claims, 6 Drawing Figures

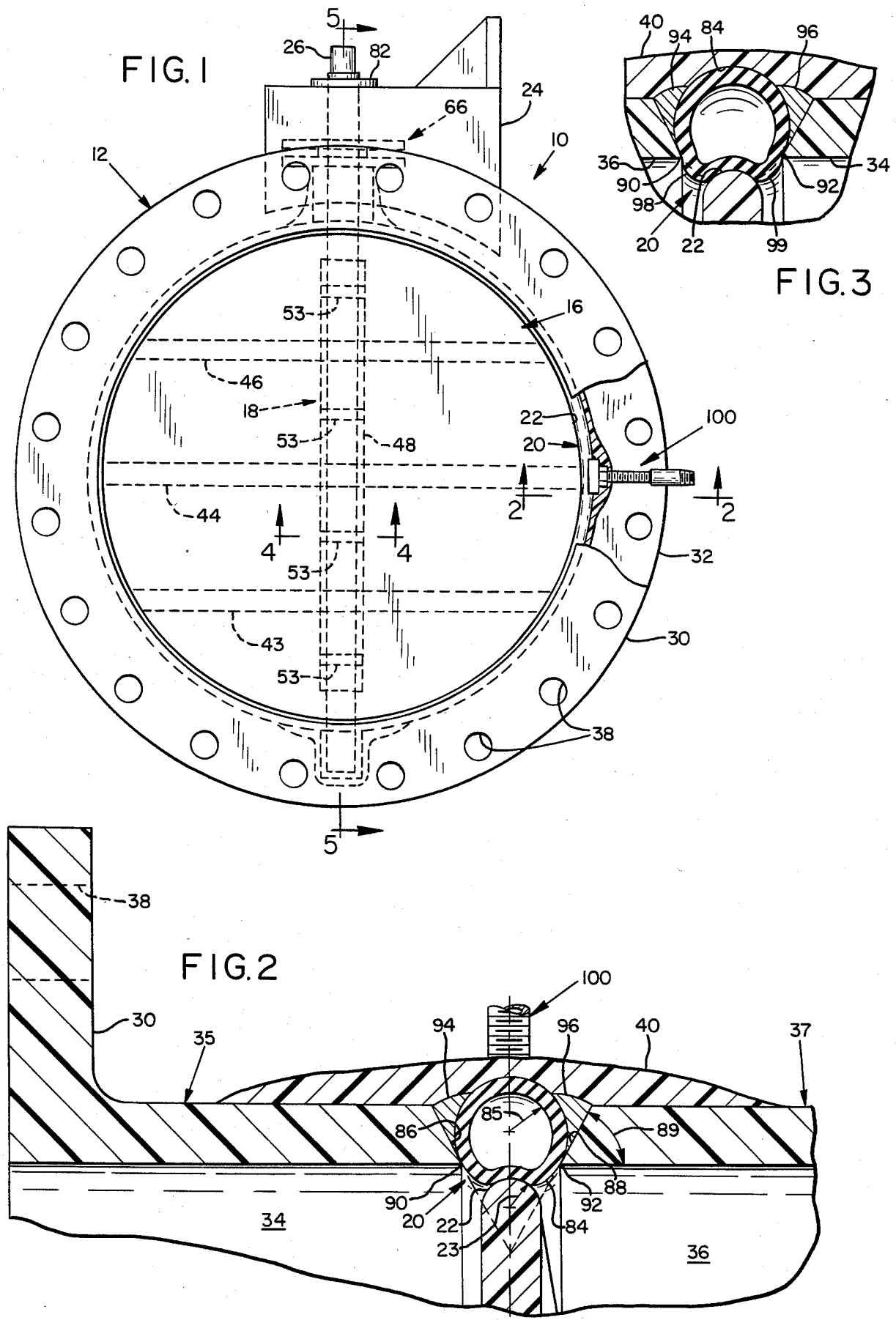

BUTTERFLY VALVE WITH PRESSURIZED O-RING SALE

BACKGROUND OF THE INVENTION

This invention relates generally to valves for use in controlling the flow of corrosive fluids, and more particularly to large dimension corrosion-resistant butterfly valves with pressurizeable seals. In the past, butterfly valves have typically been used under conditions where some leakage is acceptable. It has proven difficult to provide a positive annular seal about the disc or blade of such valves. Therefore, to minimize leakage, it is desirable to use pressure enhanced seals.

U.S. Pat. No. 1,813,126 to Shepphard discloses an early form of pressure-sealed butterfly valve. In such valve, an O-ring seal is seated in a cylindrical channel extending around the fluid passageway through the valve body. The valve disc or blade, mounted on a shaft journaled in the valve body, has a flat periphery or edge face. When the blade is closed, the seal is inflated to abut the periphery of the blade. Similar designs are disclosed in U.S. Pat. No. 2,705,016, to Saar, which further discloses offsetting the shaft from the seal, and U.S. Pat. No. 3,394,914 to Nagasato, which further discloses a split valve body construction.

Pressure-sealed butterfly valves utilizing other forms of seals are disclosed in U.S. Pat. No. 2,673,708 to Danks; U.S. Pat. No. 3,840,208 to Schudel et al; and U.S. Pat. No. 4,026,514 to Sumner et al.

The principal drawback of the foregoing designs is their inapplicability to the problem of providing valves, particularly large dimension butterfly valves, in conduits for corrosive fluids, such as pulp slurry or corrosive gases. While the Sheppard, Saar, Danks and Schudel et al patents all disclose large-dimension butterfly valves, only the Nagasato patent addresses, with reference to FIGS. 13–15, adaption of such a valve for corrosion resistance. It is apparent from the complexity and manner of construction of the foregoing valves, particularly the seats for the sealing members, that they were designed to be constructed of metal. However, most metals are unsuitable for exposure to highly corrosive fluids, unless coated with corrosion-resistant material. As noted by Nakasato, use of anti-corrosive coatings is not well-suited to medium and large valves, necessitating making the entire valve of metals that are suitable for use uncoated, such as titanium, hard lead, or high grade stainless steel. However, such metals are very heavy or very expensive, particularly for use in large dimension valves, such as those disclosed in the Saar and Schudel et al patents.

In an attempt to overcome these and other drawbacks, Ershigs, Inc. of Bellingham, Wash., has designed and fabricated large-diameter, fiberglass-reinforced plastic butterfly valves with titanium shafts and sleeves. The valve body provides a flat-surfaced cylindrical passageway and an O-ring seal is seated in the periphery of the valve blade. However, this design makes it very difficult to pressurize the seal. Also, the continued use of expensive titanium shafts and sleeves would preferably be avoided. Nothing in the prior art appears to suggest how to construct a fiberglass-reinforced plastic valve with a pressurizeable seal, or to avoid using titanium shafts and sleeves. Accordingly, there remains a need for a corrosion-resistant butterfly valve for application in large diameter passages for controlling the flow of highly corrosive fluids, and for a seal in such a valve which can be pressurized to provide, when desired, complete stoppage of fluid flow.

SUMMARY OF THE INVENTION

It is therefore one object of the invention to provide an improved corrosion-resistant butterfly valve.

A second object is to provide a fiberglass-reinforced plastic butterfly valve having a pressurizeable seal.

Another object is to minimize the need for expensive corrosion-resistant metal components in the construction of butterfly valves.

A butterfly valve in accordance with the invention has a valve body, valve blade and shaft each constructed of fiberglass-reinforced plastic, and incorporates a seal in the valve body which is preferably pressurizeable.

In one aspect of the invention, an offset actuation shaft is provided on the valve blade by mounting a fiberglass-reinforced plastic sleeve on the blade. A rod, preferably formed of continuous strand fiberglass-reinforced plastic, is fitted into the sleeve and its ends are journaled in the valve body on opposite sides of the passageway. Such ends and adjoining portions of the rod exposed within the passageway are encased by a first sealing layer of hard-surfaced material extending into the sleeve to exclude corrosive fluids and then machined to form bearing surfaces. The rod and sleeve are pinned for rotation together and an overlay or second sealing layer of fiberglass-reinforced plastic material is applied to exclude corrosive fluids from the sleeve.

In another aspect of the invention, an O-ring seal is seated in a seat formed in the wall means defining the passageway through the body of the valve. The seat is formed so as to provide oppositely-beveled side walls tangentially contacting opposite lateral sides of the O-ring seal at acute angle edges along the inner wall of the body to exclude fluid from the channel as well as seal the periphery of the valve blade. In a further aspect of the invention, the blade has a rounded periphery sized relative to the exposed portion of the O-ring seal protruding from the seat such that, when the blade is in a closed position, the O-ring cups the periphery of the blade. The thickness of the blade is preferably about half the diameter of the O-ring seal to maximize the contact area under pressure while obtaining the foregoing cupping action.

The invention also provides for a method of making a fiberglass-reinforced plastic butterfly valve with a pressurizeable seal in the valve body. The valve body is constructed in two tubular sections having opposed end faces which together form the seat for the O-ring seal. The aforementioned inverted seat is made by oppositely beveling opposed end faces of the two sections of the valve body to form acute angle edges along the inner wall of the valve body, preferably at 60° to such wall. For assembly, the two sections are coaxially aligned with the beveled end faces so that the acute angle edges abut against opposite sides of the O-ring, the O-ring being positioned in th seat thus defined so as to protrude radially inwardly a predetermined distance into the passageway. Fiberglass-reinforced plastic putty is next backfilled into the channel along the exterior lateral sides of the O-ring, remotely of the acute angle edges, to form wedges bonded to the beveled end faces for holding the O-ring securely in place. The two sections are then connected together by applying a fiberglass-reinforced plastic overlay to the outer face of the two sections so as to cover the back of the O-ring and enclose the channel on the outside of the valve body. The result is, in effect, a unitary valve body with a pressurizeable valve which is not susceptible to leakage through the valve seat.

The foregoing and other objects, features and advantages of the invention will become more readily apparent from the following detailed description of a preferred embodiment, which proceeds with reference to the accompanying drawings.

BRIEF DESCRIPTION OF DRAWINGS

FIG. 1 is a front elevational view of a butterfly valve in accordance with the invention, a portion of the valve body being cut away to show the O-ring seal and pressurization fitting.

FIG. 2 is an enlarged cross sectional view taken along lines 2—2 in FIG. 1.

FIG. 3 is a portion of the view of FIG. 2 showing the O-ring seal inflated.

DETAILED DESCRIPTION

Figure 5:
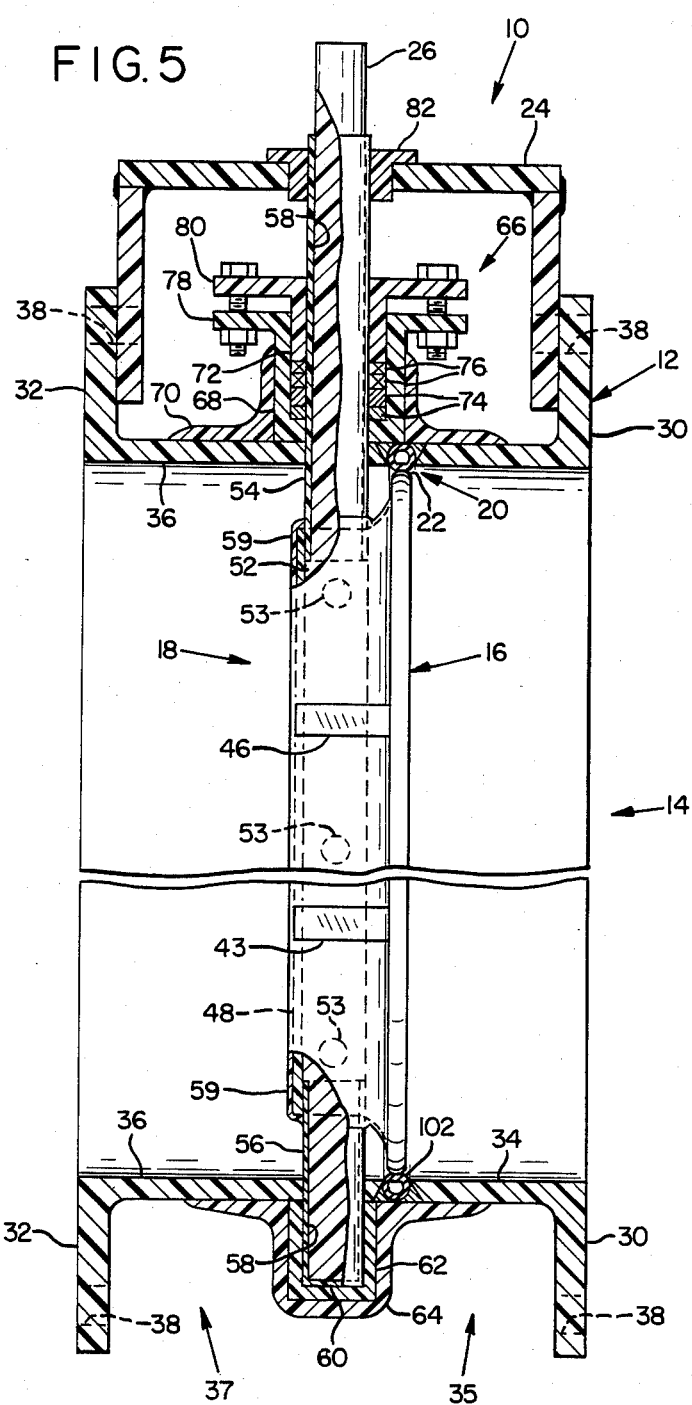
FIG. 5 is a vertical sectional view taken along lines 5—5 in FIG. 1.

Referring to FIGS. 1 and 5, butterfly valve 10 comprises a valve body 12 defining a cylindrical passageway 14, a valve disc or blade 16 mounted within the passageway on an actuation shaft 18 journaled in the valve body, and pressurized sealing means 20 seated in the valve body and extending around the passageway in position to seal against the periphery 22 of the blade. A bracket 24 is mounted on the outside of the valve body adjacent an exposed square end 26 of actuator shaft 18 for mounting a suitable actuator (not shown) on shaft end 26. Except where otherwise noted in the following description, all of the elements of butterfly valve 10 are composed of fiberglass-reinforced plastic. The resin used in construction of the valve is selected for resistance to corrosion by a particular corrosive fluid with which the valve is to be used. For example, for use with pulp slurry, it is preferable to use a vinyl ester resin. In the following description, suitable dimensions are given for parts of a 24-inch inside diameter valve, but the invention is not thereby limited.

Valve body 12 has, in cross section, a channel shape defined by a pair of parallel annular end flanges 30,32 interconnected by a cylindrical wall 34,36 extending normal to the end flanges to define passageway 14. Bolt holes 38 are spaced angularly apart around the end flanges for connecting the valve to complementary end flanges of pipes. As will be further described hereinafter, valve body 12 is constructed in two tubular parts or sections 30,34,35,37, which are interconnected during assembly of the valve by a fiberglass mat reinforced plastic overlay 40, best seen in FIG. 2. The valve body is molded to a thickness suited to the dimensions of the valve, for example, ¾-inch thick flanges 30,32 and 9/16-inch thick walls 34,36 in a 24-inch inside diameter valve. For added strength, the valve body is molded with alternating layers of fiberglass mat and fiberglass woven roving.

Valve blade 16 comprises a flat circular member or disc 42 reinforced by web members 43,44,46, connected to the back or shaft side of the blade. Such members extend normal to the plane of disc 42 and transversely of the shaft 18. Disc 42 is stamped slightly oversize from a flat sheet of fiberglass mat-reinforced plastic material of suitable thickness, for example, ½ inch thick for a 24-inch inside diameter valve. Disc 42 is machined to fit inside passageway 14, to a diameter of 1 foot, 11¾ inches outside diameter in the foregoing example, and to provide a semi-circular profile of radius 23 on the periphery 22 of the blade.

Figure 4:
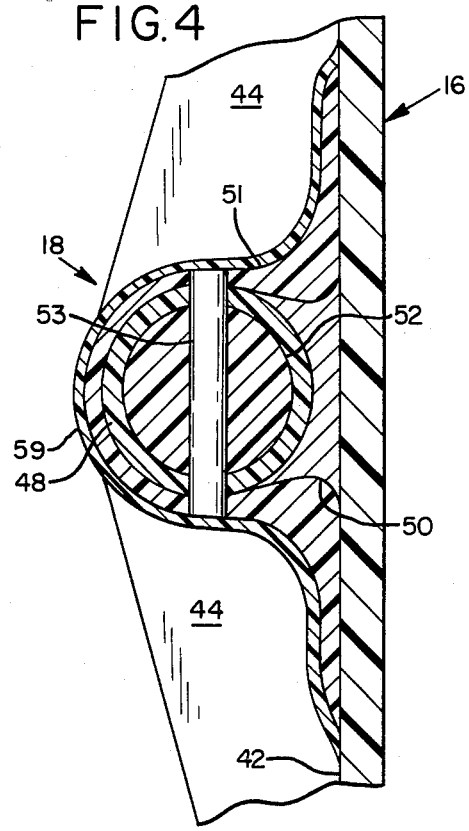
FIG. 4 is a cross sectional view taken along lines 4—4 in FIG. 1.

Referring to FIGS. 4 and 5, shaft 18 comprises a cylindrical sleeve 48 connected by fiberglass-reinforced plastic putty 50 to the back side of disc 42. Sleeve 48 is oriented parallel to disc 42 and extends through cylindrical openings (not shown) in transverse web members 43,44,46. A first layer 51 of fiberglass-reinforced plastic material covers putty 50 and sleeve 52 and extends laterally for a distance along the back side of blade 43 to strengthen the connection between the shaft and the blade.

A continuous strand fiberglass-reinforced cylindrical rod 52 extends through sleeve 48 and has a proximal and distal end portions 54,56 protruding from the ends of the sleeve and extending through wall 36 of the valve body on opposite sides of passageways 14. Four pins 53 of continuous strand fiberglass-reinforced plastic extend along a diameter through sleeve 48 and rod 52 to connect such members for rotation as a unit by the actuator (not shown). For a 24-inch valve, rod 52 has a diameter of 1½ inches.

The end portions 54,56 of rod 52 are hard surfaced to exclude corrosive fluids and for journaling in the wall of the valve. The distal end portion 56 of rod 52 is recessed and covered by a thickness of vinyl ester resin 58 encompassing the end 60 of the rod and extending along the rod for a distance into the sleeve 48. Such resin is applied in two successive layers and is selected to provide a hard or full cure surface. It is applied to a greater diameter than rod 52 and then machined down to the original diameter of the rod. The proximal end portion 54 of the rod is likewise recessed and covered with a resin layer 58 and machined. A second layer 59 of fiberglass-reinforced plastic covers layer 51 and the ends of pins 53, and extends over each end of the sleeve to integrally connect the sleeve to layers 58 of each end portion 54,56 of the rod. The entirety of the shaft is thus shielded from corrosive fluids.

Referring to FIG. 5, the distal end of the rod is received in a shaft end retainer 62, constructed of a suitable corrosion-resistant plastic bearing material, such as a KYNAR shaft end retainer, mounted on the outside of the valve body and secured thereto by a layer of fiberglass-reinforced plastic 64. The proximal end portion 54 of rod 52 extends through a sealed bearing, indicated generally at 66. Bearing 66 comprises a cup-shaped KYNAR packing housing 68 connected by fiberglass-reinforced plastic 70 to the outside of walls 34,36 of valve body 12. A KYNAR packing gland 72 is received on shaft 52 and nested in housing 68. Layered beneath the packing gland within the housing are an annular packing thrust washer 74 and a coil of graphite pump packing 76. Annular flanges 78,80 on the packing housing and packing gland, respectively, are bolted together to compress the pump packing and thrust washer in the housing. An ultra-high molecular weight plastic shaft bushing 82 supports the shaft end 26 in bracket 24.

Referring to FIGS. 2 and 3, pressurizeable seal 20 is formed by a hollow O-ring seal 84 in a seat defined by a pair of oppositely beveled, opposed side walls 86,88 forming acutely angled edges 90,92 on the inner sides of walls 34,36, tangentially contacting lateral sides of the O-ring. The O-ring is formed of a suitably corrosion-resistant material, such as a VITON seal for use with pulp slurry.

As mentioned above, the valve body is made in two sections 35,37 and 32,36. Such parts are made in a mold machined to form the oppositely-beveled end faces 86,88, preferably at a 60° angle to the inner surfaces of walls 34,36, as indicated by arrow 89. Together, such end faces define the seat for the seal having acute angle edges on the inner wall of the valve body. The two tubular sections are then mounted coaxially on a cylindrical assembly jig (not shown) which is sized to fit the inside diameter of passageway 14 and to position the flanges 30,32 parallel to one another. A semi-circular groove (not shown) extending circumferentially around the cylindrical face of the assembly jig supports the O-ring seal. This groove has a depth such that the seal can protrude a predetermined distance inwardly of walls 34,36 to expose about one-third of the circumference of the O-ring inside passageway 14. The two sections of the valve body are then moved axially together so that the acute angled edges 90,92 are spaced so as to tangentially contact the lateral sides of the O-ring seal. For an O-ring seal of one inch in diameter, such edges are spaced ⅛ inch apart.

Once the O-ring seal and the two sections of the valve body are properly positioned on the assembly jig, fiberglass-reinforced putty is filled into the seat along the exterior lateral sides of the O-ring from the outside of the valve body, that is, remotely from edges 90,92. This step, in effect, forms wedges 94,96 radially outwardly of the O-ring seal to retain the seal in its predetermined position. To maximize the adherence of the putty to the beveled end faces 86,88, such faces are first covered with 10 mil "C" glass veil and a priming resin is applied to the veil. After the putty has been applied, chopped strand mat fiberglass-reinforced plastic is applied across the O-ring seat to form overlay 40 around the exterior of the valve. This overlay is formed in a suitable thickness, for example, 9/16 inch, to provide a structural connection between the two parts of the valve body and to enclose the O-ring within its seat.

Figure 6:
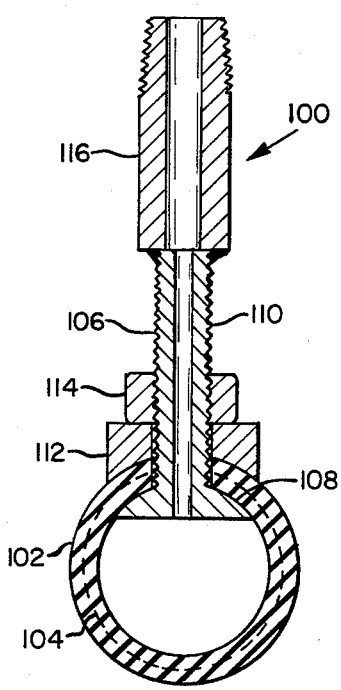
FIG. 6 is an enlarged cross sectional view similar to the view of FIG. 2 but taken through the pressurization fitting of such seal.

Referring to FIG. 6, prior to seating the O-ring seal in the valve body, a stainless steel pressurization fitting 100 is installed in the seal. The ends of a predetermined length of the O-ring seal material are machined to provide complementary male and female end portions 102,104. Such ends are mated together and secured by fitting 100. Fitting 100 comprises a hollow inlet stem 106 having a T-shaped cross-section defined by a base portion 108 and tubular portion 110. The base portion is a round member having a semi-circular convex upper face to fit a segment of the inside diameter of the O-ring. Tubular portion 110 extending through the O-ring walls, 102,104 radially outwardly of the valve body. A clamp bar 112 received over tube 110 has a convex semi-circular underside sized to fit the outside diameter of the O-ring. Member 110 is externally threaded for a nut 114 for tightening member 112 to clamp the walls of the O-ring against member 108. A threaded nipple 116 is welded on the end of tube 110 for connection to a pressure hose for inflating the seal, as shown in FIG. 3.

Having illustrated and described the principles of my invention in a preferred embodiment, it should be apparent to those skilled in the art that the invention may be modified in arrangement and detail without departing from such principles. I therefore claim as my invention all modifications coming within the scope and spirit of the following claims:

I claim:

1. A method of making a butterfly valve, comprising:
    forming a fiberglass-reinforced plastic valve body having a wall means including an inner wall defining a passageway through the valve body;
    forming a fiberglass-reinforced plastic blade with a periphery contoured to conform to the inner wall for closing the passageway; and
    forming a seal in the wall means for sealing against the periphery of the blade all around the passageway;
    the steps of forming said body and said seal including:
    forming the valve body in two tubular sections separated from one another at opposed end faces; forming the end faces so that, together, they define a seat for retaining said seal between said end faces;
    positioning the two sections in a predetermined spaced relationship abutting opposite sides of the seal to form said seat; and
    applying a fiberglass-reinforced plastic overlay externally across the seal circumferentially of the valve body structurally to join the two sections into a unitary fiberglass valve body and to secure the seal in the seat.

2. A method according to claim 1 in which the step of forming a seat includes oppositely-beveling said end faces to form a dovetail slot therebetween such that the slot has a minimum spacing at said inner wall, the sealing member having a diameter greater than said minimum spacing so as to be retained in the slot.

3. A method according to claim 1 in which the seal is an O-ring seal of a predetermined diameter; forming a seat includes oppositely-beveling said end faces so as to intersect said inner wall at acute angle corners; and the positioning step includes positioning the two sections with the O-ring seal between said beveled end faces in tangential contact with said acute angle corners so that the O-ring seal protrudes a predetermined distance into the passageway.

4. A method according to claim 3 in which the beveled end faces are acutely angled at about 60° from the inner side of the wall means.

5. A method according to claim 3 in which the applying step includes forming means defining fiberglass-reinforced plastic wedges on opposite lateral exterior sides of the O-ring seal remotely of the acute angled edges for retaining the O-ring in said position contacting said acutely angled edges.

6. A method according to claim 1 including back-filling fiberglass-reinforced plastic putty into the seat on lateral sides of the seal radially outwardly of the seal before applying said overlay.

7. A method according to claim 1, comprising:
    mounting a shaft on one side of the blade at a position offset from the periphery of the blade;
    journaling the shaft in opposite sides of the valve body for rotation of the blade between an open position and a closed position; and
    completely enclosing the shaft in fiberglass-reinforced plastic.

8. A method according to claim 7 in which the step of completely enclosing the shaft includes sizing a lengthwise end portion of the shaft to form a recess; applying a plastic resin to said end portion to fill said recess and thereby provide a hard, sealing surface on said end portion; and sizing the plastic resin to a predetermined diameter for journaling in the valve body.

9. A method according to claim 7 in which the step of mounting the shaft includes forming a sleeve on the blade; inserting the shaft in the sleeve; connecting the shaft to the sleeve for rotation together; and applying fiberglass-reinforced plastic material over at least end portions of the sleeve and adjacent portions of the shaft to exclude corrosive fluid from the sleeve.

10. A method according to claim 9 in which the step of connnecting the shaft to the sleeve means includes inserting a pin radially through the sleeve and the shaft and applying said fiberglass-reinforced plastic material over the sleeve, including over the ends of the pin.

11. A method according to claim 7 including forming the shaft of a continuous strand fiberglass-reinforced plastic rod, the step of completely enclosing the shaft comprising enclosing an end of the rod in plastic resin.

12. A method according to claim 7 in which the step of forming a seal includes forming a seat for said seal in the wall means, the seat including oppositely beveled walls defining sides of a V-shaped slot in said wall means having a minimum spacing at said inner wall and installing an O-ring seal in said slot so as to protrude radially inwardly of said inner wall.

* * * * *

UNITED STATES PATENT AND TRADEMARK OFFICE
CERTIFICATE OF CORRECTION

PATENT NO. : 4,540,457
DATED : September 10, 1985
INVENTOR(S) : RICHARD W. LaVALLEY It is certified that error appears in the above-identified patent and that said Letters Patent are hereby corrected as shown below:

On the title page and column 1 lines 1 and 2, the title should read as follows:

--BUTTERFLY VALVE WITH PRESSURIZED O-RING SEAL--

Signed and Sealed this

Eleventh Day of February 1986

[SEAL]

Attest:

DONALD J. QUIGG

*Attesting Officer*  *Commissioner of Patents and Trademarks*